April 6, 1926.
A. C. MATHIESON
AUTOMOTIVE BRAKE DEVICE
Filed July 28, 1924   2 Sheets-Sheet 1
1,579,380
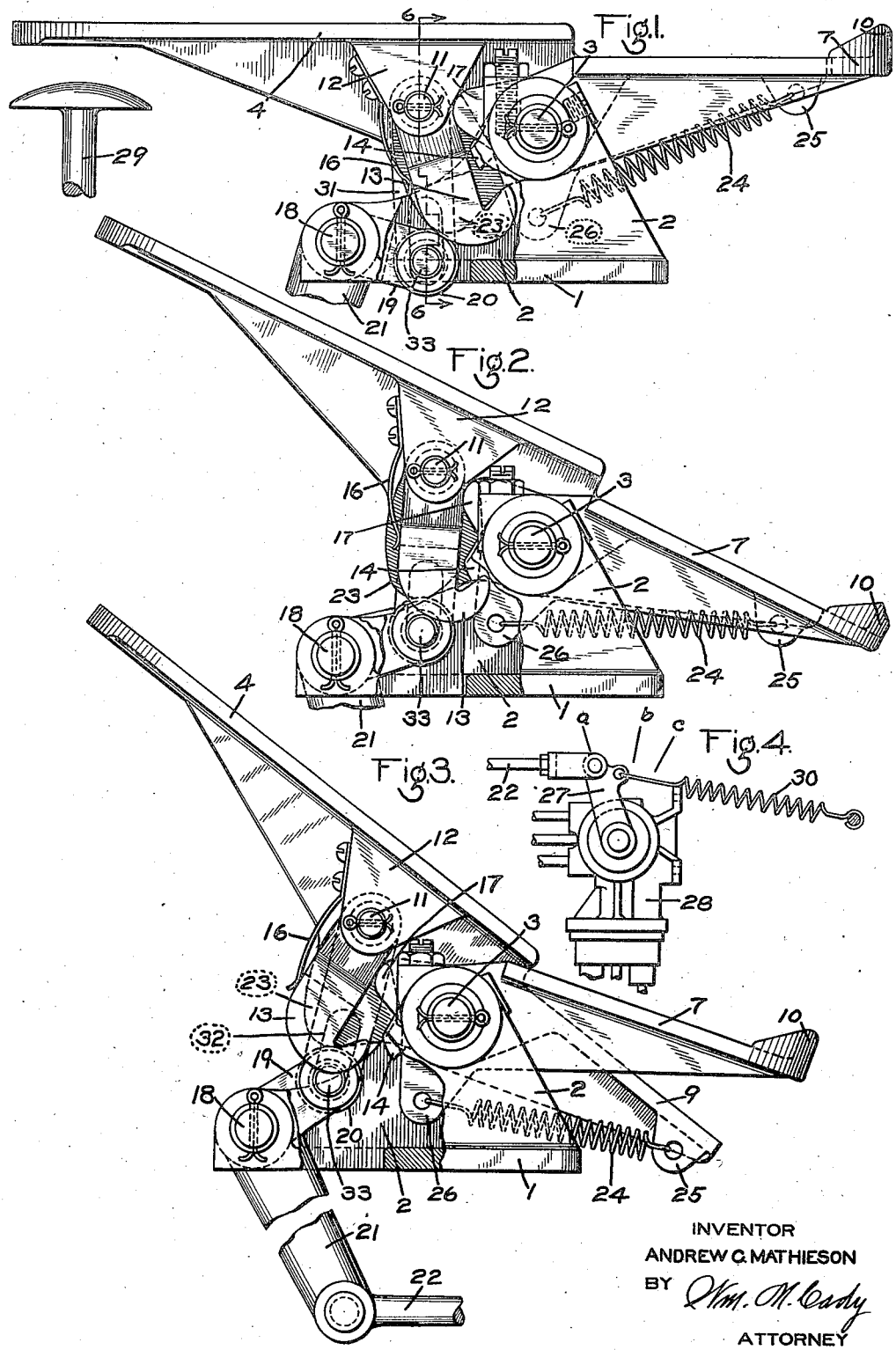
INVENTOR
ANDREW C. MATHIESON
BY Wm. W. Cady
ATTORNEY April 6, 1926.
A. C. MATHIESON
AUTOMOTIVE BRAKE DEVICE
Filed July 28, 1924
1,579,380
2 Sheets-Sheet 2
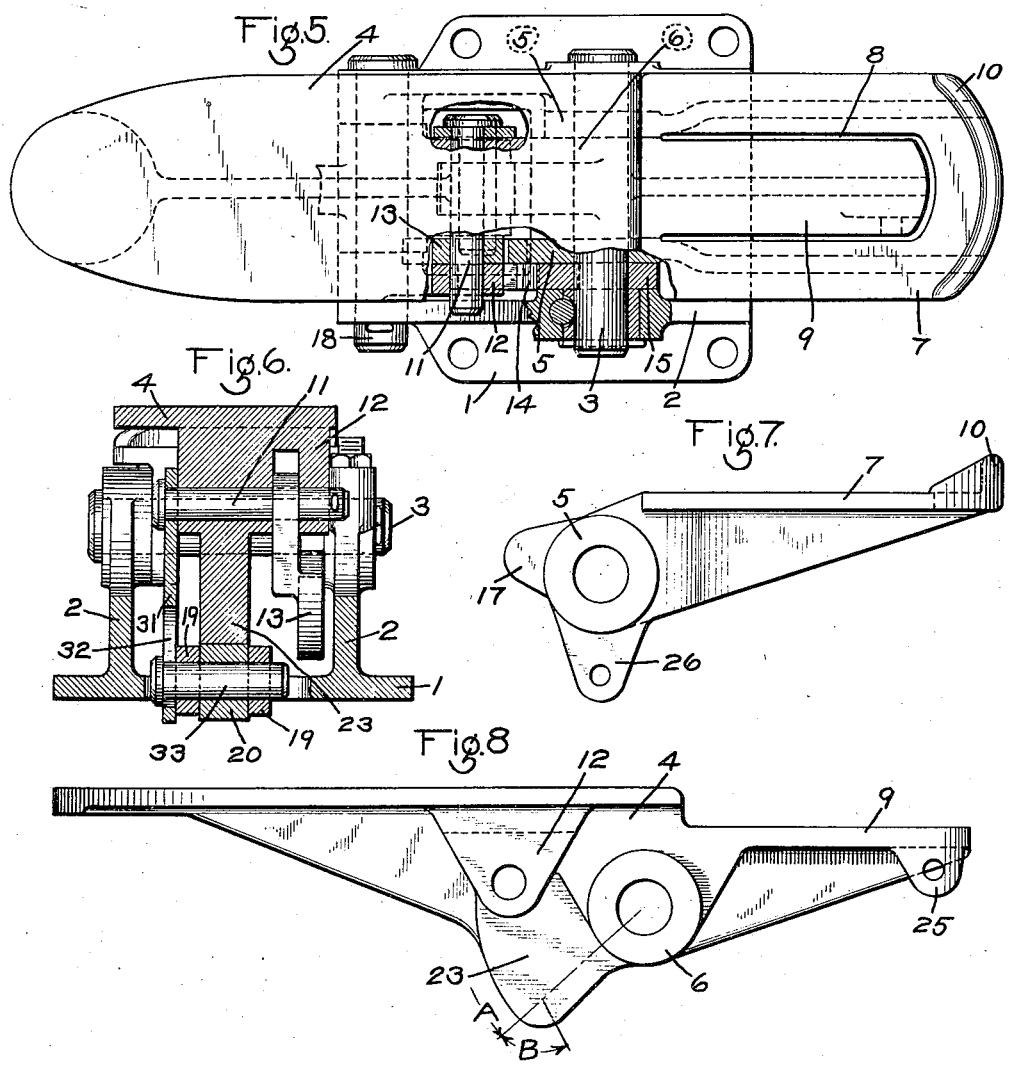
INVENTOR
ANDREW C. MATHIESON
BY *Wm. M. Cady*
ATTORNEY Patented Apr. 6, 1926.

1,579,380

UNITED STATES PATENT OFFICE.

ANDREW C. MATHIESON, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed July 28, 1924. Serial No. 728,528.

*To all whom it may concern:*

Be it known that I, ANDREW C. MATHIESON, a citizen of the United States, residing at Edgewood, in the county of Allegheny and State of Pennsylvania, have invented new and useful Improvements in Automotive Brake Devices, of which the following is a specification.

This invention relates to control devices and the principal object of my invention is to provide an improved foot controlled mechanism for controlling the brakes, the vehicle doors, and the motor accelerator.

In the accompanying drawings; Fig. 1 is a side view, partly broken away, of a foot controlled mechanism embodying my invention, and showing the pedal in brake release position; Fig. 2 a similar view, showing the pedal in full brake applied position; Fig. 3 a similar view, showing the pedal in the position assumed when the foot is removed from the pedal; Fig. 4 a side elevation of a brake valve device associated with the pedal mechanism; Fig. 5 a plan view, partly in section, of the pedal mechanism shown in Figs. 1, 2, and 3; Fig. 6 a section on the line 6—6 of Fig. 1; Fig. 7 a detail side view of the trip pedal; and Fig. 8 a detail side view of the main operating pedal of the mechanism shown in Fig. 1.

The pedal mechanism may comprise a bracket 1 adapted to be secured to the floor board of the motor vehicle and having integral upwardly extending side members 2 provided with bearings for a pin 3 upon which a main operating pedal 4 is mounted. Also mounted on the pin 3 and having bearing lugs 5 disposed at opposite sides of the bearing lug 6 of the main pedal 4 is a foot controlled lever 7.

The lever 7 is provided with a central opening 8 for receiving a rearward extension 9 of the pedal 4 and may be provided with a rear curved raised portion 10 to receive the heel of the operator. Pivotally mounted on a pin 11 having a bearing in a lug 12, formed on the under side of pedal 4, is a latch 13 normally adapted to engage a stop lug 14 of a bushing 15 secured to the pin 3, when the pedal 4 is raised to a certain position. A flat spring 16 acts on the latch 13 and tends to move same into the path of engagement with the stop lug 14.

The lever 7 is provided with a cam projection 17 adapted to engage the inner face of the latch 13 and trip the latch out of engagement with the stop member 14, when the lever 7 is allowed to move to a certain position.

Pivotally mounted on a pin 18 having bearings in the bracket 1 is a bell crank, the arm 19 of which is provided with a roller 20 at the free end. The arm 21 is pivotally connected to a rod 22. The roller 20 is adapted to engage the cam face of a lug 23 carried by the pedal 4.

A coil spring 24, connected at one end to a lug 25 carried by the portion 9 of pedal 4, and connected at the other end to a lug 26 carried by the lever 7, tends to shift the lever 7 to the position relative to pedal 4 as shown in Fig. 3.

The rod 22 is connected to the operating arm 27 of a brake valve device 28, which may be similar to the brake valve device shown in the pending application of Henry D. Hukill, Serial No. 713,259, filed May 14, 1924.

The pedal mechanism is shown in brake release position in Fig. 1 and when the pedal 4 is pressed by the foot of the operator to move in a counter-clockwise direction, the pedal will engage the usual accelerator button 29 and said button may then be operated to control the engine of the vehicle according to the extent the pedal is moved.

When the foot is applied to the pedal 4, the heel of the foot engages in the curved raised portion 10 of the lever 7 and said lever is moved and held by the foot in a parallel relation to the pedal 4. In this position, the lug 17 permits the latch 13 to assume the path of engagement of the stop lug 14, as directed by spring 16, as shown in Fig. 1.

When it is desired to apply the brakes, the foot of the operator is rocked, so as to allow the pedal 4 to move in a clockwise direction from the position shown in Fig. 1. The roller 20 then engages the cam face 23, indicated in Fig. 8 and allows an upward movement of the bell crank arm 19, according to the extent the pedal 4 is moved. The brake valve arm 27 is connected to a spring 30 which tends to shift the arm toward the right. Position "*a*", as shown in Fig. 4 is the brake release position and corresponds with the pedal position shown in Fig. 1.

When the bell crank arm 19 moves upwardly, as above described, the brake valve arm 27 is pulled toward the right from position "a" by the action of spring 30, and the brake valve device is then operated to effect an application of the brakes, the brake pressure being increased as the pedal 4 is allowed to move upwardly and as the arm 27 moves toward the full brake applied position "b".

With the foot on the pedal 4, the upward movement of the pedal is limited by the engagement of the latch 13 with the stop lug 14, as shown in Fig. 2, the corresponding position of the brake valve arm 27 being the position "b".

If the operator should remove his foot from the pedal 4 in any position, the trip lever 7 will be shifted by the action of spring 24, causing the cam projection 17 to act on the inner face of the latch 13 and throw same out of engagement with the stop lug 14. This permits of the further upward movement of the pedal 4 to the position shown in Fig. 3, and the further upward movement of the bell crank arm 19, as effected by the action of spring 30. The brake valve arm 27 is then moved to the emergency position "c", in which the brakes are fully applied and the vehicle doors are balanced, so that said doors may be readily opened.

The brakes may be released by depressing the pedal 4 to the position shown in Fig. 1, the brake valve arm being pulled to the corresponding release position "a".

In the downward movement of pedal 4 from the release position, the roller 20 engages the portion "A" of the cam member 23, which is formed as an arc of a circle struck from the axis of the pivot pin 3, so that downward movement of the pedal will not cause any movement of the roller 20. The pedal 4 is thus relieved of the force of the spring 30 while the accelerator button 29 is being operated and thus the operator is not required to exert unnecessary pressure on the pedal while the car is running, in order to operate the accelerator.

Provision is made to ensure an application of the brakes in case the spring 30 should become broken, comprising a link 31 supported at one end on the pivot pin 11, and having a slot 32 at the other end adapted to receive the pin 33 which carries the roller 20. The slot 32 is of such length as to permit of free movement of the pedal 4 and the roller 20 in the normal operation of the mechanism, but if the spring 30 should become broken, then when the pedal 4 is moved upwardly by the foot of the operator in order to apply the brakes, the end of the slot 32 in the link 31 will engage the pin 33 and thereby the pedal 4 will operate through the link 31 to pull the bell crank arm from position "a" to position "b", as will be evident, and thus cause an application of the brakes to be effected.

Having now described my invention, what I claim as new and desire to secure by Letters Patent, is:—

1. The combination with means for effecting an application of the brakes on a vehicle, of a pedal for operating said means, a device for limiting the movement of said pedal, and means operated upon removal of the foot of the operator from said pedal for releasing said device.

2. The combination with a brake valve device, of a pedal for operating said valve device to effect an application of the brakes, a latch for locking said pedal in a brake applied position, and means operated upon removal of the foot of the operator from said pedal for releasing said latch.

3. The combination with a brake valve device having a brake applied position and an emergency position, of a pedal for operating said brake valve device, a locking device for limiting the movement of said pedal and thereby the brake valve device when the foot is applied to the pedal, and means for releasing said latch and permitting the movement of the brake valve device to emergency position upon removal of the foot of the operator from said pedal.

4. The combination with a brake valve device having an emergency position and means tending to shift said valve device to emergency position, of a pedal operated by the foot for restraining movement of the brake valve device, a locking device for limiting movement of said pedal by the foot, and means operated upon removal of the foot of the operator from the pedal for releasing said locking device.

5. A brake controlling pedal mechanism on a vehicle comprising a main pedal, a latch for limiting the movement of said pedal, an auxiliary pedal, and means for releasing said latch upon removal of the foot from said auxiliary pedal.

6. A brake controlling pedal mechanism on a vehicle comprising a main pedal, a latch for limiting the movement of said pedal, an auxiliary pedal having means for releasing said latch upon movement of said auxiliary pedal, and a spring tending to move said auxiliary pedal to effect the release of said latch.

7. A brake controlling pedal mechanism on a vehicle comprising a main pedal, a stop, a latch for engaging said stop to limit the movement of said pedal, an auxiliary pedal associated with the main pedal, and means operated by the auxiliary pedal upon removal of the foot of the operator for moving said latch out of the path of engagement with respect to said stop.

8. The combination with a brake valve device, of a pedal, means for operating said brake valve device upon movement of the pedal, and additional means for operating said brake valve device by the movement of said pedal upon failure of said first mentioned means.

9. The combination with a brake valve device, of a pedal, a spring for operating said brake valve device upon movement of said pedal, and means for operating said brake valve device by the movement of the pedal upon failure of said spring.

10. The combination with a brake valve device, of a pedal, a spring for shifting said brake valve device to a position for applying the brakes upon movement of said pedal, and means for effecting the movement of said brake valve device to a position for applying the brakes upon movement of said pedal when said spring is inoperative.

11. The combination with a brake valve device and a spring tending to move said brake valve device to effect an application of the brakes, a lever mechanism operatively connected to said valve device, a pedal for opposing movement of said lever mechanism and the brake valve device by operation of said spring, and a member connecting said lever mechanism to said pedal for operating said lever mechanism and the brake valve device upon failure of said spring.

12. The combination with brake controlling means and a lever arm for operating said means, of a pedal having a member provided with a face for engaging said lever arm, one position of said face having a contour such that the pedal may be moved without moving the lever arm and another position having a contour adapted to effect movement of said lever arm upon movement of the pedal.

In testimony whereof I have hereunto set my hand.

ANDREW C. MATHIESON.